US008919374B2

(12) United States Patent
Eriksen

(10) Patent No.: US 8,919,374 B2
(45) Date of Patent: Dec. 30, 2014

(54) HYDRAULIC CONTROL VALVE WITH TWO VALVE SLIDES

(75) Inventor: Egil Eriksen, Foldrøyhamn (NO)

(73) Assignee: Tool-Tech AS, Stord (NO)

( * ) Notice: Subject to any disclaimer, the term of this patent is extended or adjusted under 35 U.S.C. 154(b) by 278 days.

(21) Appl. No.: 13/582,872

(22) PCT Filed: Mar. 3, 2011

(86) PCT No.: PCT/NO2011/000074
§ 371 (c)(1),
(2), (4) Date: Nov. 12, 2012

(87) PCT Pub. No.: WO2011/112096
PCT Pub. Date: Sep. 15, 2011

(65) Prior Publication Data
US 2013/0056659 A1     Mar. 7, 2013

(30) Foreign Application Priority Data

Mar. 6, 2010   (NO) .................................. 20100319
Mar. 2, 2011   (NO) .................................. 20110327

(51) Int. Cl.
| F16K 37/00 | (2006.01) |
| F15B 13/044 | (2006.01) |
| F16K 11/048 | (2006.01) |
| F15B 13/04 | (2006.01) |

(52) U.S. Cl.
CPC ........... *F16K 11/048* (2013.01); *F15B 13/0405* (2013.01)
USPC .................. 137/554; 137/596.17; 251/129.12

(58) Field of Classification Search
CPC ... F15B 13/0405; F15B 13/0444; F16K 11/22

USPC ......................... 137/554, 596.17; 251/129.12
See application file for complete search history.

(56) References Cited

U.S. PATENT DOCUMENTS

| 3,846,774 A * | 11/1974 | Thorbard et al. .............. 137/554 |
| 4,775,133 A * | 10/1988 | Ring et al. ............... 251/129.12 |
| 4,809,742 A | 3/1989 | Grau |
| 4,984,505 A * | 1/1991 | Leeson et al. ............ 137/596.17 |
| 6,079,442 A * | 6/2000 | Raymond et al. .............. 137/554 |
| 6,923,212 B2 * | 8/2005 | Tranovich et al. ....... 137/625.65 |
| 7,066,189 B2 * | 6/2006 | Tranovich et al. ............ 137/554 |

FOREIGN PATENT DOCUMENTS

| CN | 2190726 Y | 3/1995 |
| GB | 1244158 A | 8/1971 |

OTHER PUBLICATIONS

International search report and written opinion for application No. PCT/NO2011/000074 dated May 17, 2011.

* cited by examiner

*Primary Examiner* — John Rivell
(74) *Attorney, Agent, or Firm* — Patterson & Sheridan, LLP

(57) ABSTRACT

An electromechanically actuated, hydraulic control valve with a double slide arranged in a valve housing which is in fluid communication with at least three hydraulic-fluid ports wherein a first and a second axially movable valve slide are, independently of each other, arranged to sealingly abut corresponding portions of a double valve seat, each valve slide is provided with a slide nut which is in engagement with an external threaded portion on the valve slide and is connected via transmission means to an actuator, and to each valve slide, a position sensor is connected, arranged to indicate a rotational motion of the slide nut.

9 Claims, 5 Drawing Sheets

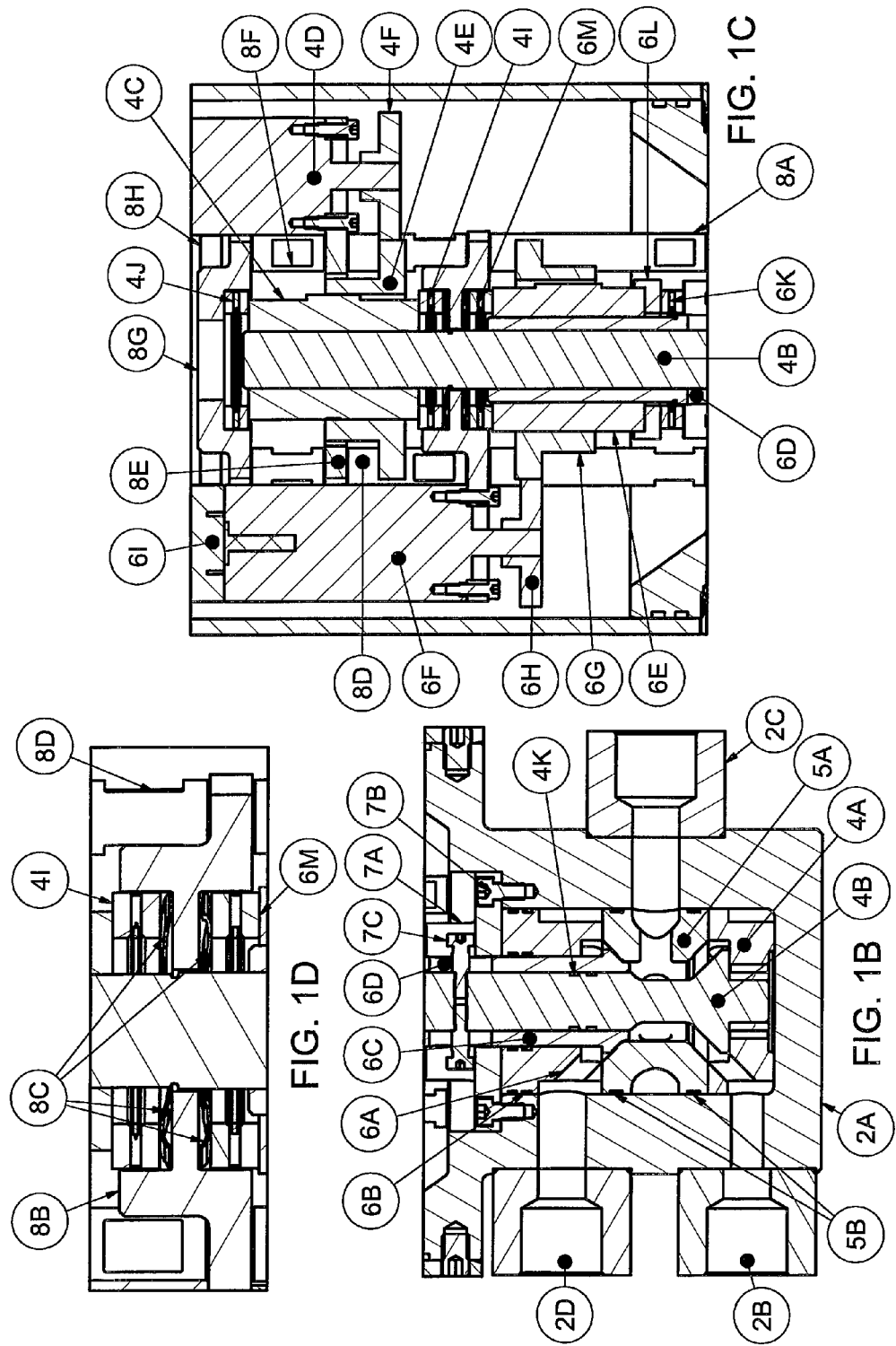

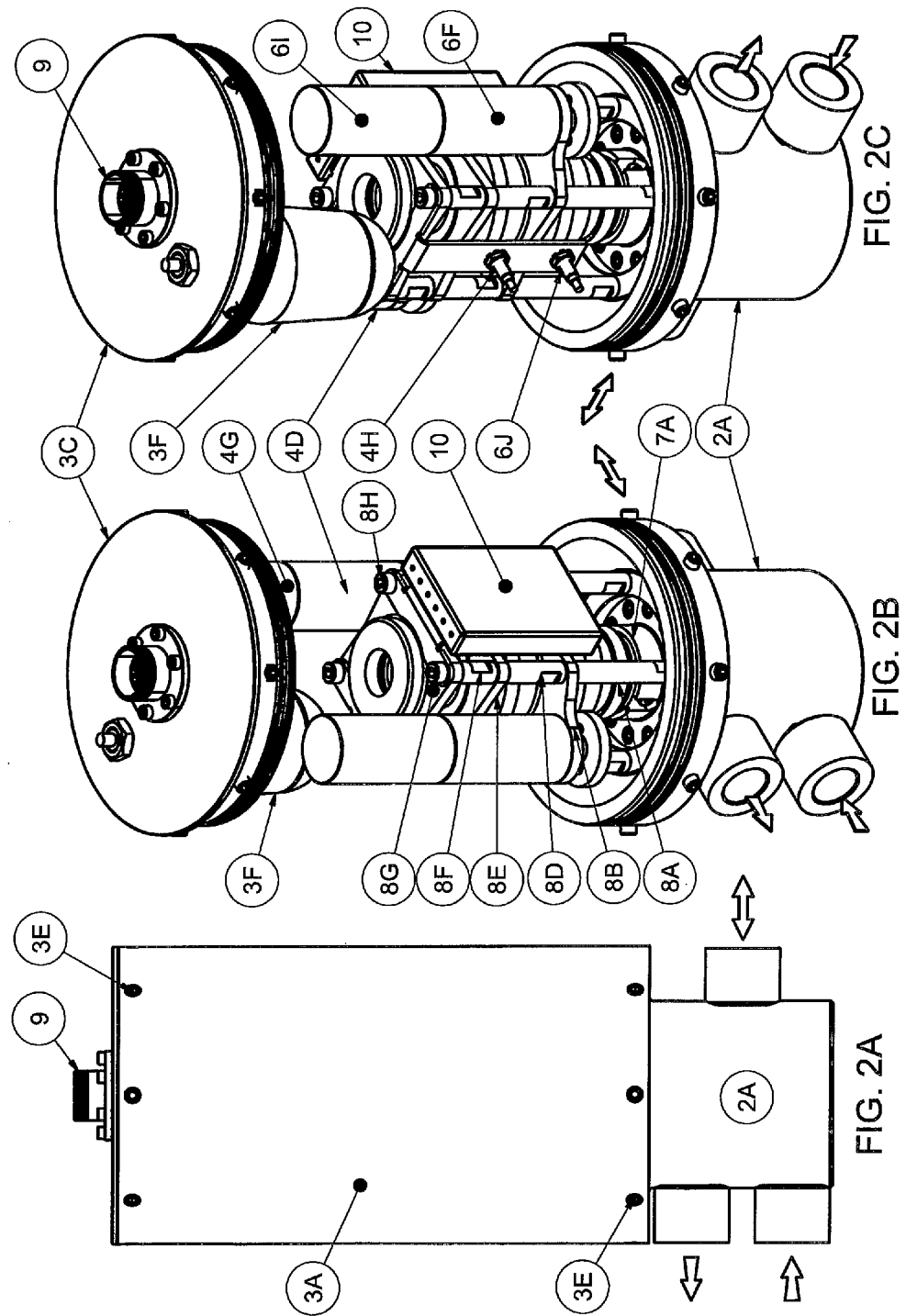

HYDRAULIC CONTROL VALVE WITH TWO VALVE SLIDES

An electromechanically actuated hydraulic control valve is described, with a slide pair arranged in a valve housing which is in fluid communication with at least three hydraulic-fluid ports. More specifically, the control valve includes a first and a second axially movable valve slide which are, independently of each other, arranged to sealingly abut corresponding portions of a double valve seat, each valve slide being provided with a slide nut which is in engagement with an external threaded portion on the valve slide and is connected via transmission means to an actuator, and there being a position sensor connected to each valve slide and arranged to indicate a rotational motion of the valve slide.

The invention has for its object to remedy or reduce at least one of the drawbacks of the prior art, or at least provide a useful alternative to the prior art.

The object is achieved through features which are specified in the description below and in the claims that follow.

The invention is to reduce hydraulic pressure shocks and give the possibility of intelligent, hydraulic control and regulation of hydraulic power at high pressures and high fluid flow rates. Depending on how the valve is controlled by a control system, the valve is used as a directional control valve with control of the opening and shutting characteristic of the valve to avoid pressure shocks in the hydraulic system, or as a regulator for hydraulic pressure or fluid flow connected to an electronic control which includes pressure transmitters or flow gauges.

The valve according to the invention provides a useful alternative to the prior art by operation of hydraulic functions with high hydraulic operating pressure and large fluid flow. The invention is well suited as directional control valve and regulator in actuation systems for subsea well equipment, such as blowout preventers for subsea drilling and well completion and for subsea well intervention equipment. The invention may have other applications for equipment installed on the surface.

In subsea control systems subsea control modules may be equipped with manifold mounted hydraulic directional control valves, with solenoids operated from the surface by way of an electronic communication solution, so that hydraulic power may be directed to actuation systems on the subsea equipment as an on/off function. For functions requiring large fluid flow at high pressure, for example cutting functions and quick disconnection of equipment, the directional control valve operates a pilot-controlled hydraulic valve which is dimensioned for the function in question. This is an on/off function without damping.

The invention relates more specifically to an electromechanically actuated, hydraulic control valve with a slide pair arranged in a valve housing in fluid communication with at least three hydraulic-fluid ports, characterized by
 a first and a second axially movable valve slide being arranged, independently of each other, to sealingly abut corresponding portions of a double valve seat,
 each valve slide being provided with a slide nut which is in engagement with an external threaded portion on the valve slide and is connected, via transmission means, to an actuator, and
 there being, connected to each valve slide, a position sensor arranged to indicate a rotational motion of the slide nut.

The second valve slide may be provided with a centric through bore, and the first valve slide is arranged in said bore in the second valve slide.

The actuator may be an electromotor.

The valve slide may be provided with rotation-preventing means, at least one anti-rotation bolt extending substantially radially out from the valve slide into an elongated, axially oriented recess in an adjacent valve housing element. In an alternative embodiment, the valve slides may be provided with rotation-preventing means, at least one anti-rotation bolt extending substantially radially out from the first valve slide, through an axially oriented, elongated groove in the second valve slide and into an elongated, axially oriented recess in an adjacent valve housing element.

The slide nut may be taken from the group consisting of roller nuts and ball nuts.

A slide gasket may provide a seal between the jacket surface of the first valve slide and the internal wall of the second valve slide.

Each of the actuators may be connected to a control system.

The position sensor may be an inductive sensor.

By actuating the two valve spindles individually with control via an electronic control system, a number of advantages are achieved with respect to flexibility and controlled operation:

- No hydraulic pilot operation—a hydraulic valve in the subsea control module and a hydraulic pipe connection from the control module to the valve are avoided.
- Automatic control of the course of operation by a return port being closed before an admission port is opened, and by the admission port being closed before the return port is opened, that is to say positive overlap.
- The valve is operated steplessly and is programmed for an opening and closing characteristic with an optimum speed for the valve function.
- Control of the applied moment when a sealing cone on the valve slide is pressed against the valve seat.
- The valve has an alternative application as a regulator for hydraulic pressure or fluid flow. Physically, the design of the valve is the same. The regulating function is a function of software and processing of signals from pressure or flow gauges.
- By the use of the valve as a hydraulic regulator, hysteresis due to friction is avoided. This is a known problem with mechanical regulators.
- There is no risk of the regulator being set into oscillations, which is a known and serious problem with mechanical regulators.
- Good accuracy for regulation.
- Electronic change of set point for regulation.
- Increased system flexibility through the possibility of programming the error function of the valve.
- The valve position is assured independently of the operational pressure. Hydraulic hold function is avoided.
- Active monitoring of the position of the valve via both a position transmitter in the actuator and inductive sensors registering turns of the slide nut.
- Robust structure, intended for high pressures and large fluid flow.
- Can possibly be used for water hydraulics with ceramic or acid-proof parts and an acid-proof housing.

In what follows are described examples of a preferred embodiment which is visualized in the accompanying drawings, in which:

FIG. 1B shows the valve housing in a sectional view;

FIG. 1C shows actuating devices and mounting arrangements in a sectional view;

FIG. 1D shows details of the mounting arrangement for the slide nut in a sectional view;

FIG. 2A shows a side view of the valve arrangement according to the invention;

FIGS. 2B and 2C show perspective views of the valve arrangement in which an actuator casing has been removed for reasons of exposition;

Figure 1A:
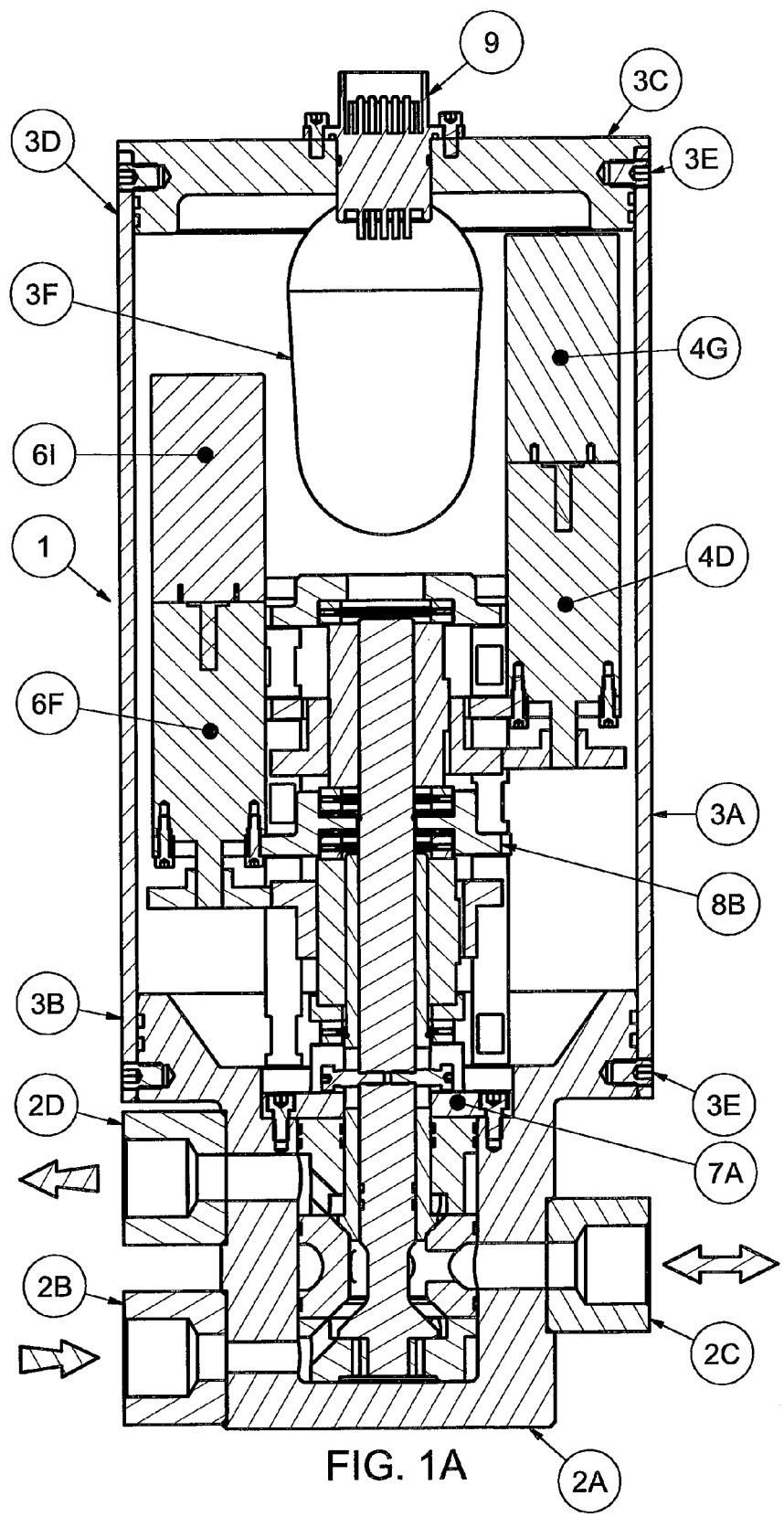
FIG. 1A shows a longitudinal section of the valve with actuating devices.

In FIGS. 1A-2C, the reference numeral 1A indicates a first embodiment of an electromechanically actuated, hydraulic control valve 1 with a valve housing 2A with an admission port 2B, an outlet port 2C and a return port 2D for hydraulic fluid, a double valve seat 5A, two valve slides 4B, 6D, and appurtenant slide bearings 4A, 6A. The valve slides 4B, 6D are provided with sealing cones, known per se, at a first end and an actuating part projecting from the valve housing 2A. In this embodiment, the first valve slide 4B is arranged in a centric through bore in the second valve slide 6D.

To each of the slides 4B, 6D, a slide nut 4E, 6E, respectively, is connected, surrounding a portion of the valve slide 4B, 6D, the slide nut 4E, 6E being formed as a roller nut or a ball nut. The choice of nut type depends on what pitch a threaded portion on the valve slide has got. The slide nuts 4E, 6E are connected to respective electric motors 4G, 6I with slide gears 4D, 6F, respectively, and gearwheel transmissions 4F, 6H, respectively.

The actuating devices of the slides 4B, 6D are surrounded by an actuator casing 3A provided with an end cap 3C. The actuator casing 3A fits tightly against the valve housing 2A by means of a first gasket set 3B and is attached to the valve housing 2A by means of attachment screws 3E. In the same way, the end cap 3C fits tightly against the actuator casing 3A by means of a second gasket set 3D and is attached to the actuator casing 3A by means of attachment screws 3E. The actuator casing 3A is pressure-compensated by means of an integrated pressure compensator 3F.

FIG. 1B shows a detail of the valve housing 2A. Inside the valve housing 2A, at the admission port 2B a first slide bearing 4A for the first valve slide 4B is formed, provided with a fluid bore which communicates with the inlet port 2B. A double valve seat 5A for, respectively, the supply and return of hydraulic fluid is provided with a fluid bore which is connected to the outlet port 2C. The double valve seat 5A is provided with external valve housing gaskets 5B sealing against the valve housing 2A. At the return port 2D of the valve, a slide bearing 6A for the second valve slide 6D is placed. The slide bearing 6A is provided with a fluid bore which communicates with the return port 2D.

The first valve slide 4B moves at the centre of the hollow second valve slide 6D. The first and second valve slides 4B and 6D, respectively, are moved by the actuating devices of the valve 1, the valve slides 4B, 6D projecting through an opening at the centre of a valve housing end cover 7A which is screwed to a recess in the valve housing 2A by attachment screws 7B. From the first, inner valve slide 4B, two anti-rotation bolts 7C in the form of screws screwed into threaded holes in the valve slide 4B project substantially radially outwards, and the anti-rotation bolts extend through elongated, axially oriented grooves in the second, outer valve slide 6D and into elongated, axially oriented recesses in the end cover 7A. The anti-rotation bolts 7C prevent the valve slides from turning, whereas the recesses in the end cover 7A and the grooves in the second valve slide 6D enable axial displacement of the valve slides 4B, 6D.

The following barrier seals separate the pressurized valve housing 1 from the pressure-compensated space in which the actuating devices are placed: a) an outer, second slide bearing gasket 6B between the valve housing 2A and the second slide bearing 6A, b) an inner, second slide bearing gasket 6C between the second valve slide 6D and the second slide bearing 6A, and c) a slide gasket 4K which provides a seal between the jacket surface of the first, inner valve slide 4B and the internal wall of the second, outer valve slide 6D.

To the first slide nut 4C, two first slide nut bearings 4I, 4J are connected. To the second slide nut 6E, two second slide nut bearings 6K, 6M are connected.

FIG. 2B shows, in perspective, the mounting arrangement for the actuating devices of the valve 1. Spacing bolts 8A are secured in threaded holes in the valve housing 2A. A mounting arrangement 8B for the slide nut bearings 4I, 6M between the is two slide nuts 4C, 6E forms, together with second spacing bolts 8D, an attachment for the second slide gear 6F as well. A mounting arrangement 8E for the first slide gear 4D together with third spacing bolts 8F formed an attachment for an end plate 8G for the first slide nut 4C, the third spacing bolts 8F being secured with attachment screws 8H.

As shown in FIG. 1D, springs 8C are placed between the mounting arrangement 8B and the slide nut bearings 41, 6M to keep the arrangement pre-tensioned.

FIG. 2A shows the outside of the cylindrical actuator casing 3A enclosing the actuating device for the first and second valve slides 4B, 6D. From the outside of the end cap 3C, a cable connection (not shown) extends through a cable bushing 9 for signal and electrical-power supply cables. Extending on the inside of the actuator casing 3A, between the cable bushing 9 and an electronics container 10 and out of this, there are several cable connections (not shown). The actuator casing 3A is filled with an electrically insulating medium, for example silicone oil, and is pressure-compensated against the surrounding seawater pressure via the pressure compensator 3F.

FIGS. 2B and 2C show the valve 1 with the internal actuating devices in perspective, the actuator casing having been removed for reasons of exposure.

FIG. 1C shows a longitudinal section of the actuating devices. The two slide nuts 4C, 6E are attached to the mounting arrangement with slide nut bearings 4I, 4J, 6K, 6M at either end. One second slide nut bearing 6K is placed between a distance plate 6L and the end cover 7A of the valve housing. Yet another second slide nut bearing 6M is placed between the second slide nut 6E and the mounting arrangement 8B. Between the mounting arrangement 8B and the first slide nut 4C, one first slide nut bearing 4I is placed. A further first slide nut bearing 4J is placed between the first slide nut 4C and the end plate 8G.

The second slide nut 6E is in engagement with a threaded portion on the second valve slide 6D. The slide nut 6E is rotated by a second electromotor 6I via a second slide gearwheel 6G externally on the second slide nut 6E, a second intermediate drive gear 6H, and a second slide gear 6F on the motor shaft.

The first slide nut 4C is in engagement with a threaded portion on the first valve slide 4B. The slide nut 4C is rotated by a first electromotor 4G via a first slide gearwheel 4E externally on the first slide nut 4C, a first intermediate drive gear 4F, and a first slide gear 4D on the motor shaft as shown in FIG. 1A.

Two position sensors 4H, 6J, respectively, for example inductive sensors, are used to register turns of the slide gearwheels 4E, 6G on the slide nuts 4C, 6E.

When the valve 1 is used as an "intelligent" directional control valve to operate a double-acting hydraulic actuator function, two valves may be used, or the valve 1 can be used exclusively for critical functions like disconnection or cutting functions, whereas the less demanding hydraulic return stroke of the actuator device is operated by some prior art.

When the valve 1 is operated as a directional control valve for a hydraulic actuator function, the return port 2D is first closed by the second valve slide 6D being actuated so that the sealing cone on the end of the valve slide 6D is pressed against the return side of the valve seat 5A and seals against this. The valve 1 is then opened to hydraulic supply from the admission port 2B by the first valve slide 4B being actuated so that the sealing cone on the valve slide 4B is moved away from the valve seat 5A and hydraulic fluid is flowing through the fluid bore of the first slide bearing 4A past the seat 5A and the sealing cone on the first valve slide 4B and further through the fluid bore of the seat 5A to the outlet port 2C. To avoid pressure surges in the hydraulic system, the first valve slide 4B is actuated in accordance with a preprogrammed opening characteristic. When the valve 1 is to open to the return of hydraulic fluid from the outlet side of the valve 1 to the return port 2D, the admission to the valve 1 is first closed by the first valve slide 4B being actuated so that the sealing cone on the end of the valve slide 4B is pressed against the supply side of the valve seat 5A and seals against this. Then the second valve slide 6D is actuated, so that the sealing cone on the valve slide 6D is moved away from the return side of the valve seat 5A, and hydraulic fluid is flowing from the outlet side of the valve 1 through the fluid bore of the seat 5A, past the return side of the valve seat 5A and the sealing cone on the second valve slide 6D and out through the fluid bore in the second slide bearing 6A to the return port 2D.

The valve 1 may also be operated as a regulator for hydraulic pressure or fluid flow. There is no physical difference in the equipment, the different lies in the valve 1 being operated as a regulator by means of a regulating function in software and signals from pressure transmitters or flow gauges (not shown) for continuous feedback to the control function, so that the valve 1 is adjusted automatically in relation to the set point of the control system for the regulated pressure or fluid flow desired. The opening and closing sequences of the valve 1 function in a manner equal to that described above also when the valve is used for regulating purposes.

Figure 3A:
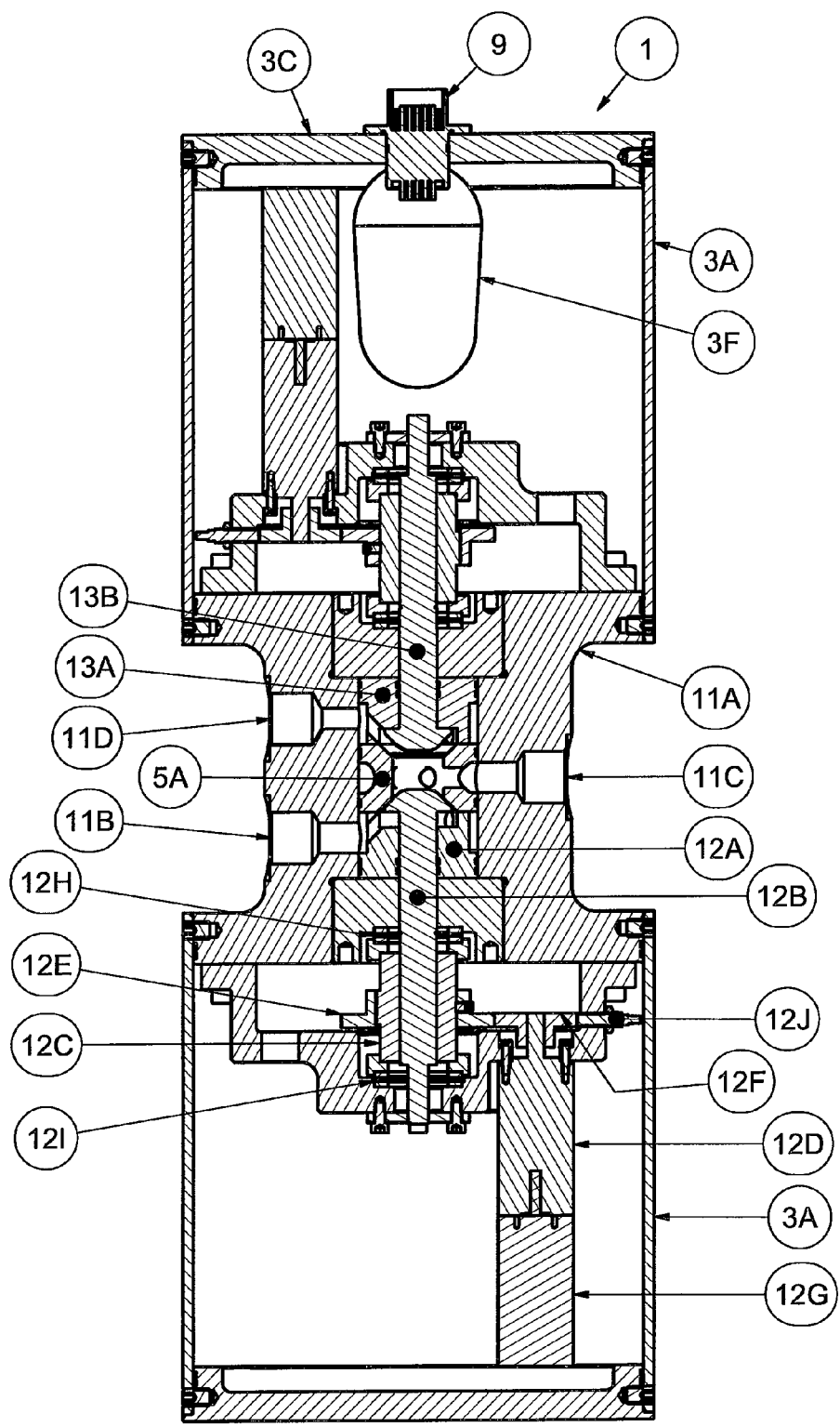
FIG. 3A shows a longitudinal section of an alternative valve embodiment.

FIG. 3A shows a solution which is different from the solution in FIG. 1A in that the first and second valve slides 12B, 13B, respectively, are actuated from their respective ends of the valve housing 11A. The valve housing 11A is provided with a mounting surface at either end for the attachment of the actuator casings 3A enclosing each of the actuating devices. In other respects, the valve function is identical with the solution that is shown in FIG. 1A.

Figure 3B:
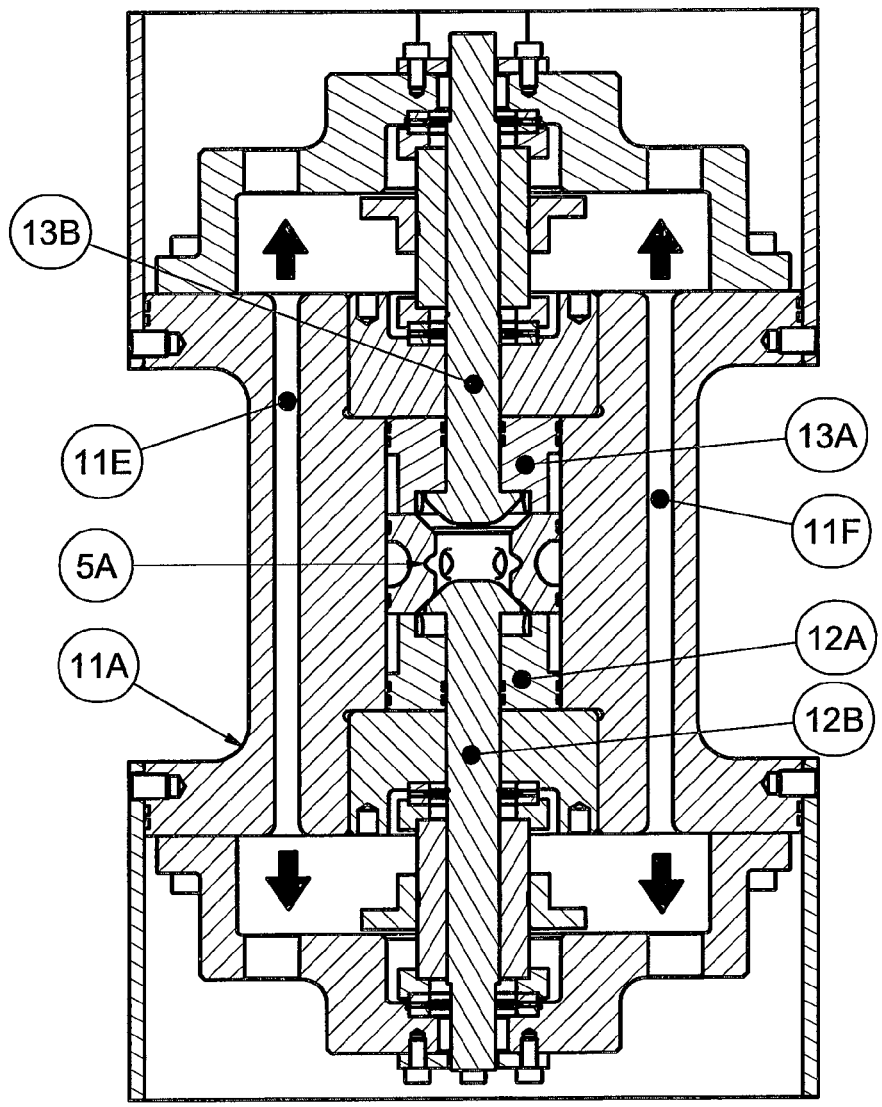
FIG. 3B shows a sectional view of a valve housing according to the alternative embodiment of the valve arrangement.

FIG. 3B shows that the valve housing 11A is provided with two channels 11E, 11F. A fluid channel 11E connects the two fluid-filled spaces for the actuating devices, so that in a subsea embodiment they are pressure-compensated by means of the common compensator 3F. A cable duct 11F is arranged for internal cable passage between the casings on either end of the valve housing.

Further components, which also have their parallels in what is described above, are termed like this: Admission port 11B, outlet port 11C, return port 11D, first slide bearing 12A, slide nut 12C, slide gear 12D, slide nut gearwheel 12E, intermediate drive gear 12F, electromotor 12G, slide nut bearings 12H and 12I, position sensor 12J and second slide bearing 13A.

The invention claimed is:

1. An electromechanically actuated, hydraulic control valve with a slide pair arranged in a valve housing which is in fluid communication with at least three hydraulic-fluid ports, wherein
   a first and a second axially movable valve slide are, independently of each other, arranged to sealingly abut corresponding portions of a double valve seat,
   each valve slide is provided with a slide nut which is in engagement with an external threaded portion on the valve slide and is connected via transmission means to an actuator, and
   to each valve slide, a position sensor is connected, arranged to indicate a rotational motion of the slide nut.

2. The electromechanically actuated, hydraulic control valve according to claim 1, wherein the second valve slide is provided with a centric, through bore, and the first valve slide is arranged in said bore in the second valve slide.

3. The electromechanically actuated, hydraulic control valve according to claim 1, wherein the actuator is an electromotor.

4. The electromechanically actuated, hydraulic control valve according to claim 1, wherein the valve slides are provided with rotation-preventing means, at least one anti-rotation bolt extending substantially radially out from at least one of the first or second valve slides into an elongated, axially oriented recess in an adjacent valve housing element.

5. The electromechanically actuated, hydraulic control valve according to claim 2, wherein the valve slides are provided with rotation-preventing means, at least one anti-rotation bolt extending substantially radially out from the first valve slide, through an axially oriented, elongated groove in the second valve slide and into an elongated, axially oriented recess in an adjacent valve housing element.

6. The electromechanically actuated, hydraulic control valve according to claim 1, wherein the slide nut is taken from the group consisting of roller nuts and ball nuts.

7. The electromechanically actuated, hydraulic control valve according to claim 2, wherein a slide gasket provides a seal between a jacket surface of the first valve slide and an internal wall of the second valve slide.

8. The electromechanically actuated, hydraulic control valve according to claim 1, wherein each of the actuators is connected to a control system.

9. The electromechanically actuated, hydraulic control valve according to claim 1, wherein the position sensor is an inductive sensor.

* * * * *